United States Patent [19]
Krechel et al.

[11] 4,088,147
[45] May 9, 1978

[54] AIR CHUCK

[75] Inventors: Joseph L. Krechel, Chesterfield; Michael J. Purvis, Ladue, both of Mo.

[73] Assignee: Control Devices, Incorporated, St. Louis, Mo.

[21] Appl. No.: 704,066

[22] Filed: Jul. 9, 1976

[51] Int. Cl.² ............................................. F16K 15/20
[52] U.S. Cl. ................................ 137/223; 251/149.1; 251/368
[58] Field of Search ................... 137/223, 231; 251/149.1, 339, 368; 285/334, 390

[56] References Cited

U.S. PATENT DOCUMENTS

| | | | |
|---|---|---|---|
| 1,370,128 | 3/1921 | Kraft | 137/223 |
| 2,166,874 | 7/1939 | Monzingo | 137/231 X |
| 2,482,922 | 9/1949 | Marcum | 137/223 |
| 3,109,672 | 11/1963 | Franz | 205/334 |
| 3,561,726 | 2/1971 | Iannelli | 251/149.6 |

Primary Examiner—Harold W. Weakley
Attorney, Agent, or Firm—Koenig, Senniger, Powers and Leavitt

[57] ABSTRACT

An air chuck molded of synthetic resin material having a body with bores therein for the flow of air through the body. A check valve is provided in one of the bores and an end cap is threaded into this one bore to maintain the check valve in its desired position within the bore. This one bore has internal threads therein recessed from the outer end of the air chuck body so that, with the cap threaded into the bore, the cap is flush with or somewhat recessed into the bore whereby the internal threads in the air chuck body are protected from damage.

1 Claim, 3 Drawing Figures

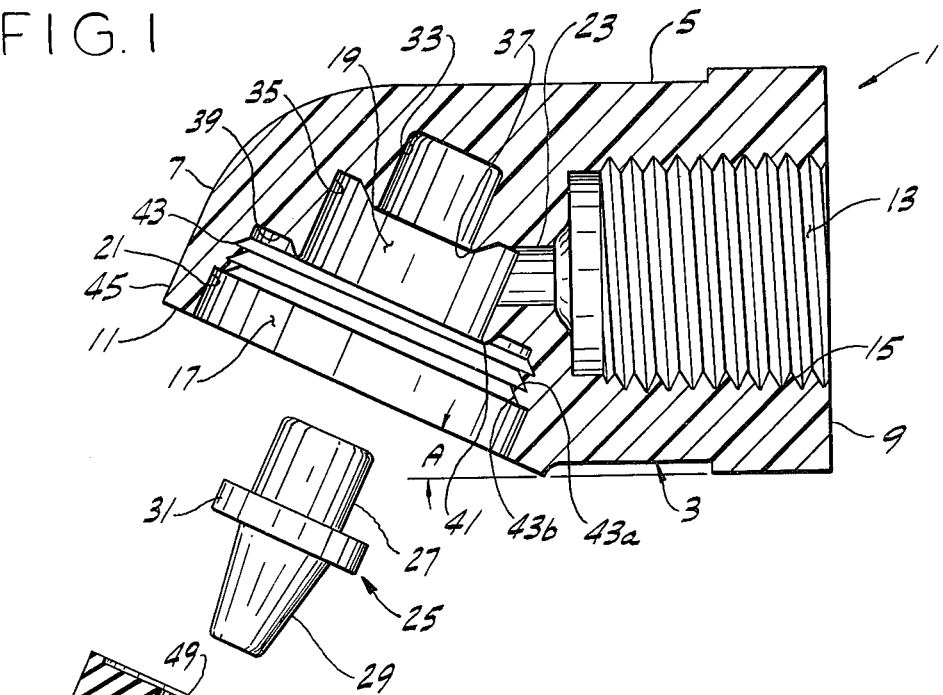
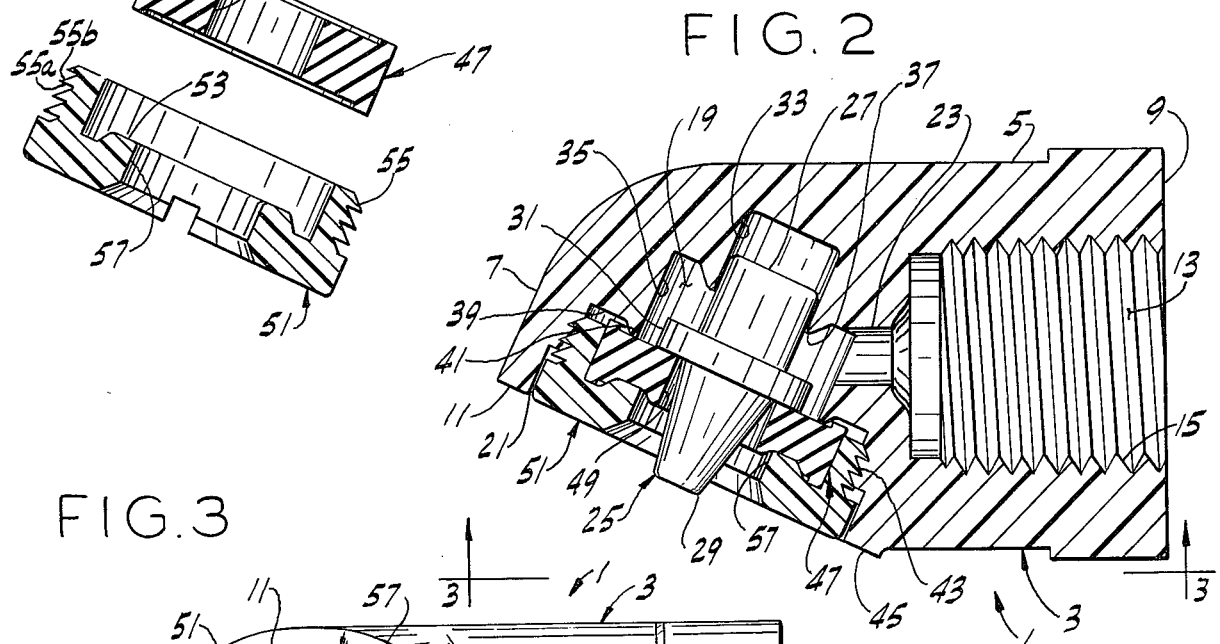
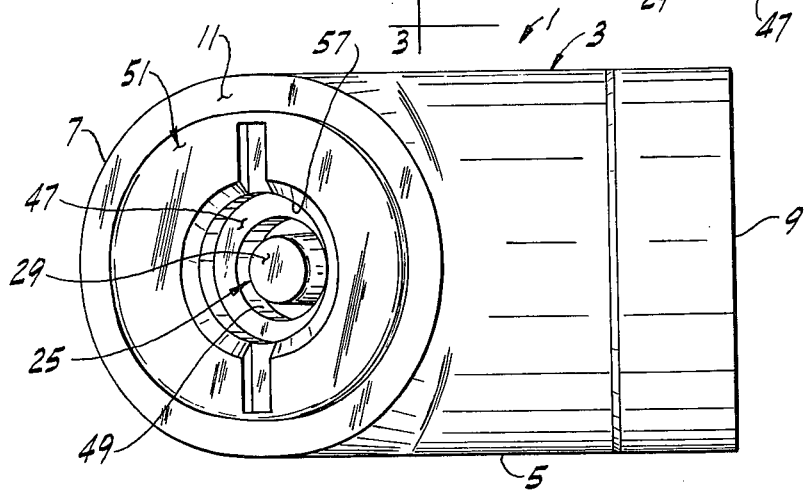

AIR CHUCK

BACKGROUND OF THE INVENTION

This invention relates to an air chuck for a compressed air hose used to inflate automobile tires or the like, and more particularly to such air chuck molded of synthetic resin material.

Conventional air chucks are made of metal, usually a brass alloy, and are typically machined on automatic screw machines. Generally, these prior art air chucks have a body with a bore therethrough adapted for connection to an air hose. A check valve is provided in the body which is normally held closed by air pressure and which is moved to an open position when the air chuck is applied to a valve stem on a tire to be inflated. The air chuck has a cap which has an opening therethrough for reception of the valve stem. The cap is threaded into a bore in the air chuck body to hold the check valve in assembled position. This bore in the air chuck body has internal threads engageable with external threads on the cap, these internal threads extending into the chuck body from the outer end of the bore. With the cap screwed into the bore, the cap extends out beyond the body.

In use, air chucks are often subject to severe abuse as they may be run over by automobiles or trucks, they may be thrown with whiplike action on the end of an air hose against the concrete floor, and they are subject to abraision as they are dragged along a driveway or floor. Due to the increasing cost of material and labor, conventional brass air chucks are expensive to manufacture.

In developing air chucks molded of synthetic resin material, it was found necessary to keep the size of the air chuck as small as possible (e.g., approximately the size of conventional brass air chucks) so as to permit the new air chuck to be applied to tire valve stems or other air fittings in cramped quarters (e.g., certain automobile hub cap designs limit access to the valve stem). Even the strongest available synthetic resin material does not have the modulus of elasticity or compressive strength of brass. This presents severe problems in designing an air chuck of synthetic resin material of relatively small size having the same strength and resistance to severe abuse as a conventional brass air chuck.

SUMMARY OF THE INVENTION

Among the several objects of this invention may be noted the provision of an air chuck, such as above described, molded of a suitable synthetic resin material which is compact in size, which will withstand relatively high air pressures and severe abuse, which has a long service life, and which may be readily and inexpensively manufactured. Other objects and features of this invention will be in part apparent and in part pointed out hereinafter.

Briefly, an air chuck of this invention molded of synthetic resin material comprises a body having a main body portion and a head portion angled relative to the main body portion, the main body portion having an end face constituting a back face and the head portion having an end face constituting a front face. An axial bore, constituting an inlet bore, is provided in the main body portion extending inwardly into the main body portion from the back face, this inlet bore being adapted for connection to an air hose or the like. An axial bore, constituting an outlet bore, is provided in the head portion extending inwardly into the head portion from the front face, a portion of this outlet bore constituting a first recess. The air chuck further includes a valve member received in the first recess. Another portion of the outlet bore constitutes a second recess coaxial with the first recess. A gasket is received in the second recess and a cap is installable into the second recess for holding the valve member and the gasket in assembled relation. The body has a passage therein for providing communication between the inlet bore and the first recess. The gasket and the cap each have an opening therethrough for the flow of air therethrough, the valve member being movable in the first recess from an outer sealing position in which it sealingly engages the gasket for blocking the flow of air from the air chuck and the inner open position in which it is clear of the gasket thereby permitting air to flow from the passage past the valve member and through openings in the gasket and the cap. The cap has external threads thereon and the outlet bore is internally threaded for reception of the cap threads. The improvement of this invention comprises the above-mentioned internal threads being recessed into the outlet bore with portions of the head portion extending outwardly beyond the internal threads to constitute a lip. Upon the cap being threaded into the outlet bore, the outer face of the cap is substantially flush with the outer edge of the lip whereby the internal threads in the head portion are protected from damage.

BRIEF DESCRIPTION OF THE DRAWINGS

FIG. 1 is an enlarged, exploded longitudinal cross-section of an air chuck of the present invention;

FIG. 2 is an enlarged, assembled longitudinal cross-sectional view of the air chuck of this invention; and FIG. 3 is an enlarged, elevational view taken on line 3—3 of FIG. 2.

Corresponding reference characters indicate corresponding parts throughout the several views of the drawings.

DESCRIPTION OF A PREFERRED EMBODIMENT

Referring now to the drawings, an air chuck of the present invention, generally indicated at 1, is shown molded of a suitable synthetic resin material, as will be hereinafter specified. The air chuck comprises a body 3 having a main portion 5 and a head portion 7. The main body portion has a back end face 9 generally perpendicular to the longitudinal axis of the air chuck and head portion 7 has a front face 11. As shown in FIG. 1, the head portion is angled relative to the main body portion with the plane of front face 11 being angled relative to the longitudinal center line of the body portion at an angle A ranging between about 20° to 30° and preferably about 25°. This allows the air chuck of this invention to be readily held in the hand of the user so as to be conveniently applied to an automobile tire valve stem (not shown) or the like. The main body portion has an axial bore 13 extending inwardly from back face 9, this last-mentioned bore constituting an inlet bore. Main body portion 5 has internal threads 15 formed therein along the sides of bore 13 for sealing connection of the air chuck to an air hose (not shown) or the like. Head portion 7 has an axial bore 17 therein constituting an outlet bore extending inwardly from front face 11. Bore 17 has first and second recesses 19 and 21, respectively, therein coaxial with the center line of bore 17. As shown, a passage 23 provides communication between bore 13 and recess 19 of bore 17 for the flow of air through air chuck body 3 in a manner as will appear.

A check valve member 25 is provided in air chuck 1 so as to block the flow of air therethrough unless the air chuck is properly applied to an automobile valve stem (not shown) or the like. This check valve member has a base portion 27, an actuating stem 29, and an annular sealing flange 31 surrounding the valve member intermediate its ends. Recess 19 includes a central portion 33 adapted to loosely receive base portion 27 of valve member 25, and an enlarged portion 35 of larger diameter than central portion 33 for reception of flange 31. Enlarged portion 35 has a raised annular seat 37 surrounding central portion 33 of recess 19 for engaging the inner face of flange 31. Check valve member 25 may be molded of the same synthetic resin material as main body 3.

Recess 21 of bore 17 is of larger diameter than recess 19 and has an inner base 39, the latter being spaced outwardly from seat 37 a distance greater than the thickness of flange 31 on valve member 25. Base 39 has an inner annular seat 41 surrounding recess 19. Head portion 7 has internal buttress threads 43 formed on the inner wall of bore 17 extending up from base 39 for purposes as will appear. A lip 45 constituting a part of head portion 7 extends out beyond threads 43. A ring-shaped gasket 47 of resilient elastomeric material is received in recess 21 and sealingly engages seat 41. This gasket has a central opening 49 into which actuator stem 29 of the valve member 25 extends (see FIG. 2). A cap 51 having a recess 53 therein and external buttress threads 55 thereon is inserted into recess 21 so that its external threads engage internal threads 43. Upon fully threading the cap into recess 21, gasket 47 is sealingly seated on seat 41 and against the inner or back face of the cap. The cap has a central opening 57 therethrough for reception of the end of an automobile tire valve stem (not shown) or other air fitting whereby the end of the valve stem may engage the outer face of gasket 47 surrounding its opening 49 and actuator stem 29 of check valve member 25. The latter is movable axially within recess 19 between an outer closed position (as shown in FIG. 2) in which the outer ace of this flange 31 sealingly engages the inner face of gasket 47 thereby to block the flow of air from bore 17 and an inner open position (not shown) in which the flange is clear of the gasket thereby to permit the flow of air through the air chuck. It will be noted that air pressure in recess 19 normally holds valve member 25 closed. Upon a valve stem or other air fitting engaging actuator stem 29 of valve member 25, the latter is moved against the bias of air pressure within recess 19 away from gasket 47 and thereby to open the valve.

As shown in FIGS. 1 and 2, threads 43 in bore 17 and mating threads 55 on cap 51 are buttress threads. Threads 43 have a flat back face 43a perpendicular to the axis of bore 17 and an inclined front face 43b, inclined at 45° to the axis of the bore. Threads 55 on cap 51 have a flat front face 55a engageable with the flat back face 43a of threads 43 and an inclined back face 55b. Thus, upon the air chuck of this invention being connected to a pressurized air source, flat faces 43a and 55a of threads 43 and 55 interengage so as to resist axial internal pressure forces and to seal cap 51 relative to body 3 even if the body expands radially due to internal pressure forces.

In accordance with this invention, with cap 51 fully threaded into recess 21, lip 45 extends out to the outer face or beyond the cap so that the cap is at least flush with or somewhat recessed into recess 21. Thus, threads 43 and recess 21 are set back from the edge of the head portion a considerable distance (e.g., about 3/16 in. or 3.75 mm) so as to protect the threads from damage (i.e., to prevent cracking or splitting of the head portion in the area of the threads) in the event the air chuck is subject to severe impact loading, such as may be occasioned upon an air chuck of this invention fitted on the end of an air hose being thrown against a concrete driveway or floor with whiplike action, or subject to an extreme crushing load, such as may be experienced if the air chuck is run over by a heavy vehicle or other object.

As previously mentioned, air chuck body 3, valve member 25 and cap 51 may be molded of a suitable synthetic resin material, such as a crystalline acetyl copolymer based on trioxane and commercially available under the registered trademark CELCON from the Celanese Corporation. It will be understood, however, that other suitable resins may be used.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In an air chuck molded of synthetic resin material comprising a body having a main portion and a head portion, said main portion having an end face constituting a back face, said head portion having an end face constituting a front face, an axial bore constituting an inlet bore extending into said main portion from said back face, one end of said inlet bore being adapted for connection to an air line or the like and constituting the sole air inlet for said air chuck, an axial bore constituting an outlet bore extending into said head portion from said front face, a portion of said outlet bore constituting a first recess therein, a valve member received in said first recess, another portion of said outlet bore constituting a second recess coaxial with said first recess, a gasket received in said second recess, and a cap securable in said second recess for holding said valve member and said gasket in assembled relation, a passage in said body providing communication between said inlet bore and said first recess of said outlet bore, said gasket and said cap each having an opening therethrough for the flow of air from said air chuck, said valve member being movable in said first recess from a closed position in which it sealingly engages said gasket for blocking the flow of air from said air chuck and an open position in which it is clear of said gasket thereby permitting air to flow from said passage, past said valve member, and through said openings in said gasket and said cap, these last-said openings constituting the sole air outlet for said air chuck, said cap having external threads thereon and said outlet bore being internally threaded for reception of said cap threads; wherein the improvement comprises said internal threads in said outlet bore being recessed into the outlet bore and a portion of said head portion constituting a lip extending continuously around said outlet bore out beyond said internal threads so that upon said cap being threaded into said outlet bore, the outer face of said cap is substantially flush with the outer edge of said lip whereby said internal threads in said outlet bore and the cap are protected from damage, the plane of said front face intersecting the axis of said inlet bore at an included angle ranging between 20° and 30°, said internal and external threads being buttress threads having a first face generally perpendicular to the longitudinal axis of said outlet bore and a second face inclined to said longitudinal axis, said first face on said internal threads facing inwardly of said outlet bore, said first face of said external threads interengaging said first face of said internal threads whereby said first faces resist internal pressure forces acting on said cap and insure that said cap remains sealed to said body even if said body expands radially due to said internal pressure.

* * * * *